United States Patent
Lee et al.

(10) Patent No.: US 9,518,633 B2
(45) Date of Patent: Dec. 13, 2016

(54) POWER TRANSMISSION APPARATUS FOR VEHICLE

(71) Applicant: Hyundai Motor Company, Seoul (KR)

(72) Inventors: Suengho Lee, Seoul (KR); Kyeonghun Lee, Seoul (KR); Jongmin Kim, Hwaseong-si (KR); Changyeon Cho, Seoul (KR); Jonghyo Park, Seoul (KR); Minjun Song, Gunpo-si (KR); Jongsool Park, Hwaseong-si (KR); Byunghyun Lee, Gyeonggi-do (KR); Seongwook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,608

(22) Filed: Dec. 3, 2014

(65) Prior Publication Data

US 2016/0108993 A1  Apr. 21, 2016

(30) Foreign Application Priority Data

Oct. 17, 2014 (KR) .................. 10-2014-0141155

(51) Int. Cl.
*F16H 3/08* (2006.01)
*F16H 3/00* (2006.01)
*F16H 3/093* (2006.01)

(52) U.S. Cl.
CPC ....... *F16H 3/006* (2013.01); *F16H 2003/0822* (2013.01); *F16H 2003/0931* (2013.01); *F16H 2200/0056* (2013.01)

(58) Field of Classification Search
CPC .. F16H 3/006; F16H 2003/0931; F16H 3/091; F16H 47/02

USPC .................. 74/330, 331, 333, 340
See application file for complete search history.

(56) References Cited

U.S. PATENT DOCUMENTS

| | | | |
|---|---|---|---|
| 3,589,483 A * | 6/1971 | Smith | F16H 3/097 192/3.52 |
| 7,340,973 B2 * | 3/2008 | Hiraiwa | F16D 21/04 74/330 |
| 7,383,749 B2 * | 6/2008 | Schafer | F16H 3/006 74/330 |

(Continued)

FOREIGN PATENT DOCUMENTS

| | | |
|---|---|---|
| JP | 2004-239441 A | 8/2004 |
| JP | 2007-332991 A | 12/2007 |

(Continued)

*Primary Examiner* — Ha D Ho
(74) *Attorney, Agent, or Firm* — Morgan, Lewis & Bockius LLP

(57) ABSTRACT

A power transmission apparatus may include first and second input shafts; first and second clutches; first and second output shafts; first set of input gears fixed on first input shaft; second set of input gears fixed on second input shaft; first set of speed gears rotatable on first output shaft and engaged with first set of input gears or second set of input gears; second set of speed gears rotatable on second output shaft and engaged with first or second set of input gears; first set of synchronizers selectively connecting first set of speed gears to first output shaft; second set of synchronizers selectively connecting second set of speed gears to second output shaft; and reverse speed output unit engaged with one input gear of first and second sets of input gears, and second idle gear engaged with one speed gear of first and second sets of speed gears.

12 Claims, 5 Drawing Sheets

(56) References Cited

U.S. PATENT DOCUMENTS

| | | | |
|---|---|---|---|
| 9,003,905 B1* | 4/2015 | Lee | F16H 3/093 |
| | | | 74/330 |
| 2006/0266141 A1* | 11/2006 | Ogami | F16H 3/006 |
| | | | 74/325 |
| 2007/0266810 A1* | 11/2007 | Forsyth | F16H 3/006 |
| | | | 74/331 |
| 2015/0167806 A1* | 6/2015 | Lee | F16H 61/0403 |
| | | | 475/5 |
| 2015/0184732 A1* | 7/2015 | Lee | F16H 37/046 |
| | | | 475/5 |

FOREIGN PATENT DOCUMENTS

| | | |
|---|---|---|
| KR | 10-0802712 | 2/2008 |
| KR | 10-1063506 B1 | 9/2011 |

* cited by examiner

FIG. 2

| Gear stage | CL1 | CL2 | SL1 | | | SL2 | | | SL3 | | | SL4 | | SL5 | |
|---|---|---|---|---|---|---|---|---|---|---|---|---|---|---|---|
| | | | D1 | N | D5 | D2 | N | D4 | D3 | N | D7 | D6 | N | IDG1 | N |
| R |  | △ | ● |  |  |  | ○ |  |  | ○ |  |  | ○ |  | ● |  |
| N |  |  |  | ○ |  |  | ○ |  |  | ○ |  |  | ○ |  |  | ○ |
| 1ST | △ |  | ● |  |  |  | ○ |  |  | ○ |  |  | ○ |  |  | ○ |
| 2ND |  | △ |  | ○ |  | ● |  |  |  | ○ |  |  | ○ |  |  | ○ |
| 3RD | △ |  |  | ○ |  |  | ○ |  | ● |  |  |  | ○ |  |  | ○ |
| 4TH |  | △ |  | ○ |  |  |  | ● |  | ○ |  |  | ○ |  |  | ○ |
| 5TH | △ |  |  |  | ● |  | ○ |  |  | ○ |  |  | ○ |  |  | ○ |
| 6TH |  | △ |  | ○ |  |  | ○ |  |  | ○ |  | ● |  |  |  | ○ |
| 7TH | △ |  |  | ○ |  |  | ○ |  |  |  | ● |  | ○ |  |  | ○ |

△ : Engagement of clutch
● : Engagement
○ : Neutral

POWER TRANSMISSION APPARATUS FOR VEHICLE

CROSS-REFERENCE TO RELATED APPLICATION

The present application claims priority to and the benefit of Korean Patent Application No. 10-2014-0141155 filed on Oct. 17, 2014, the entire contents of which is incorporated herein for all purposes by this reference.

BACKGROUND OF THE INVENTION

Field of the Invention

The present invention relates to a power transmission apparatus for a vehicle using a double clutches. More particularly, the present invention relates to a power transmission apparatus for a vehicle that can reduce length and weight of the power transmission apparatus by minimizing the number of components involved in a reverse speed.

Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

The DCT includes two clutch devices and a gear train applied to a manual transmission. The DCT selectively transmits torque input from an engine to two input shafts by using two clutches, changes a speed by using the gear train, and outputs the changed torque.

Such the DCT is used to realize a compact transmission having more than five forward speeds. Since two clutches and synchronizing devices are controlled by a controller according to the DCT, manual shift maneuver is unnecessary for controlling the DCT. Therefore, the DCT is one type of automated manual transmissions (AMT).

The DCT, compared with an automatic transmission using planetary gear sets, has excellent power delivery efficiency and change and addition of components is very easy in the DCT. Therefore, the DCT can meet fuel consumption regulations and multi-speeds efficiency may be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of reducing the number of components and a length and improving mountability by transmitting torque of an engine from one input shaft to another input shaft so as to achieve a reverse speed.

A power transmission apparatus for a vehicle according to an exemplary embodiment of the present invention may include: a first input shaft selectively connected to a power source through a first clutch; a second input shaft selectively connected to the power source through a second clutch; first and second output shafts disposed in parallel with the first and second input shafts; a first set of input gears fixedly disposed on the first input shaft; a second set of input gears fixedly disposed on the second input shaft; a first set of speed gears rotatably disposed on the first output shaft and engaged with the first set of input gears or the second set of input gears; a second set of speed gears rotatably disposed on the second output shaft and engaged with the first set of input gears or the second set of input gears; a first set of synchronizers selectively connecting the first set of speed gears to the first output shaft; a second set of synchronizers selectively connecting the second set of speed gears to the second output shaft; and a reverse speed output unit including a reverse idle shaft disposed in parallel with the first and second output shafts, a first idle gear engaged with any one input gear of the first and second sets of input gears, and a second idle gear engaged with any one speed gear of the first and second sets of speed gears, wherein one of the first idle gear and the second idle gear is fixedly disposed on the reverse idle shaft and the other of the first idle gear and the second idle gear is rotatably disposed on the reverse idle shaft, and wherein the reverse speed output unit includes a further synchronizer selectively connecting the other of the first idle gear and the second idle gear to the reverse idle shaft.

The first set of input gears may include first, second, third, and fourth input gears, and the second set of input gears may include fifth and sixth input gears.

The first set of speed gears may include a first speed gear engaged with the second input gear, a second speed gear engaged with the fifth input gear, a fourth speed gear engaged with the sixth input gear, and a fifth speed gear engaged with the fourth input gear, and the second set of speed gears may include a third speed gear engaged with the third input gear, a sixth speed gear engaged with the sixth input gear, and a seventh speed gear engaged with the first input gear.

The first set of synchronizers may include a first synchronizer selectively connecting the first speed gear or the fifth speed gear to the first output shaft, and a second synchronizer selectively connecting the second speed gear or the fourth speed gear to the first output shaft, and the second set of synchronizers may include a third synchronizer selectively connecting the third speed gear or the seventh speed gear to the second output shaft, and a fourth synchronizer selectively connecting the sixth speed gear to the second output shaft.

In various exemplary embodiments, the first idle gear may be engaged with the first input gear and the second idle gear may be engaged with the second speed gear.

The first idle gear may be rotatably disposed on the reverse idle shaft and the second idle gear may be fixedly disposed on the reverse idle shaft.

In various exemplary embodiments, the first idle gear may be engaged with the first input gear and the second idle gear may be engaged with the fourth speed gear.

The first idle gear may be fixedly disposed on the reverse idle shaft and the second idle gear may be rotatably disposed on the reverse idle shaft.

The power transmission apparatus may further include a first output gear fixedly disposed on the first output shaft and outputting torque of the first output shaft; and a second output gear fixedly disposed on the second output shaft and outputting torque of the second output shaft.

A power transmission apparatus for a vehicle according to another exemplary embodiment of the present invention may include: a first input shaft selectively connected to a power source through a first clutch and having first, second, third, and fourth input gears fixedly disposed thereon; a second input shaft selectively connected to the power source through a second clutch and having fifth and sixth input gears fixedly disposed thereon; a first output shaft disposed in parallel with the first and second input shafts and having first, second, fourth, and fifth speed gears engaged respectively at least one of the input gears and rotatably disposed on the first output shaft; a second output shaft disposed in parallel with the first and second input shafts and having third, sixth, and seventh speed gears engaged respectively at least one of the input gears and rotatably disposed on the second output shaft; at least one synchronizer selectively connecting the speed gears on the first output shaft to the first output shaft or selectively connecting the speed gears on the second output shaft to the second output shaft; and a reverse speed output unit including a reverse idle shaft disposed in parallel with the first and second output shafts, a first idle gear engaged with any one input gear of the first and second sets of input gears, and a second idle gear engaged with any one speed gear of the first and second sets of speed gears, wherein one of the first idle gear and the second idle gear is fixedly disposed on the reverse idle shaft and the other of the first idle gear and the second idle gear is rotatably disposed on the reverse idle shaft, and wherein the reverse speed output unit includes a further synchronizer selectively connecting the other of the first idle gear and the second idle gear to the reverse idle shaft.

The first speed gear may be engaged with the second input gear, the second speed gear may be engaged with the fifth input gear, the third speed gear may be engaged with the third input gear, the fourth speed gear may be engaged with the sixth input gear, the fifth speed gear may be engaged with the fourth input gear, the sixth speed gear may be engaged with the sixth input gear, and the seventh speed gear may be engaged with the first input gear.

The at least one synchronizer may include: a first synchronizer selectively connecting the first speed gear or the fifth speed gear to the first output shaft; a second synchronizer selectively connecting the second speed gear or the fourth speed gear to the first output shaft; a third synchronizer selectively connecting the third speed gear or the seventh speed gear to the second output shaft; and a fourth synchronizer selectively connecting the sixth speed gear to the second output shaft.

In various exemplary embodiments, the first idle gear may be engaged with the first input gear and the second idle gear may be engaged with the second speed gear.

The first idle gear may be rotatably disposed on the reverse idle shaft and the second idle gear may be fixedly disposed on the reverse idle shaft.

In various exemplary embodiments, the first idle gear may be engaged with the first input gear and the second idle gear may be engaged with the fourth speed gear.

The first idle gear may be fixedly disposed on the reverse idle shaft and the second idle gear may be rotatably disposed on the reverse idle shaft.

The power transmission apparatus may further include: a first output gear fixedly disposed on the first output shaft and outputting torque of the first output shaft; and a second output gear fixedly disposed on the second output shaft and outputting torque of the second output shaft.

According to exemplary embodiments of the present invention, torque of an engine is transmitted from one input shaft to another input shaft so as to achieve a reverse speed. The number of components may be reduced and a length of a power transmission apparatus may be minimized.

In addition, since the number of components is reduced, weight and cost may be reduced and mountability of the power transmission apparatus may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmitting apparatus for a vehicle according to the various exemplary embodiments of the present invention.

Figure 1:
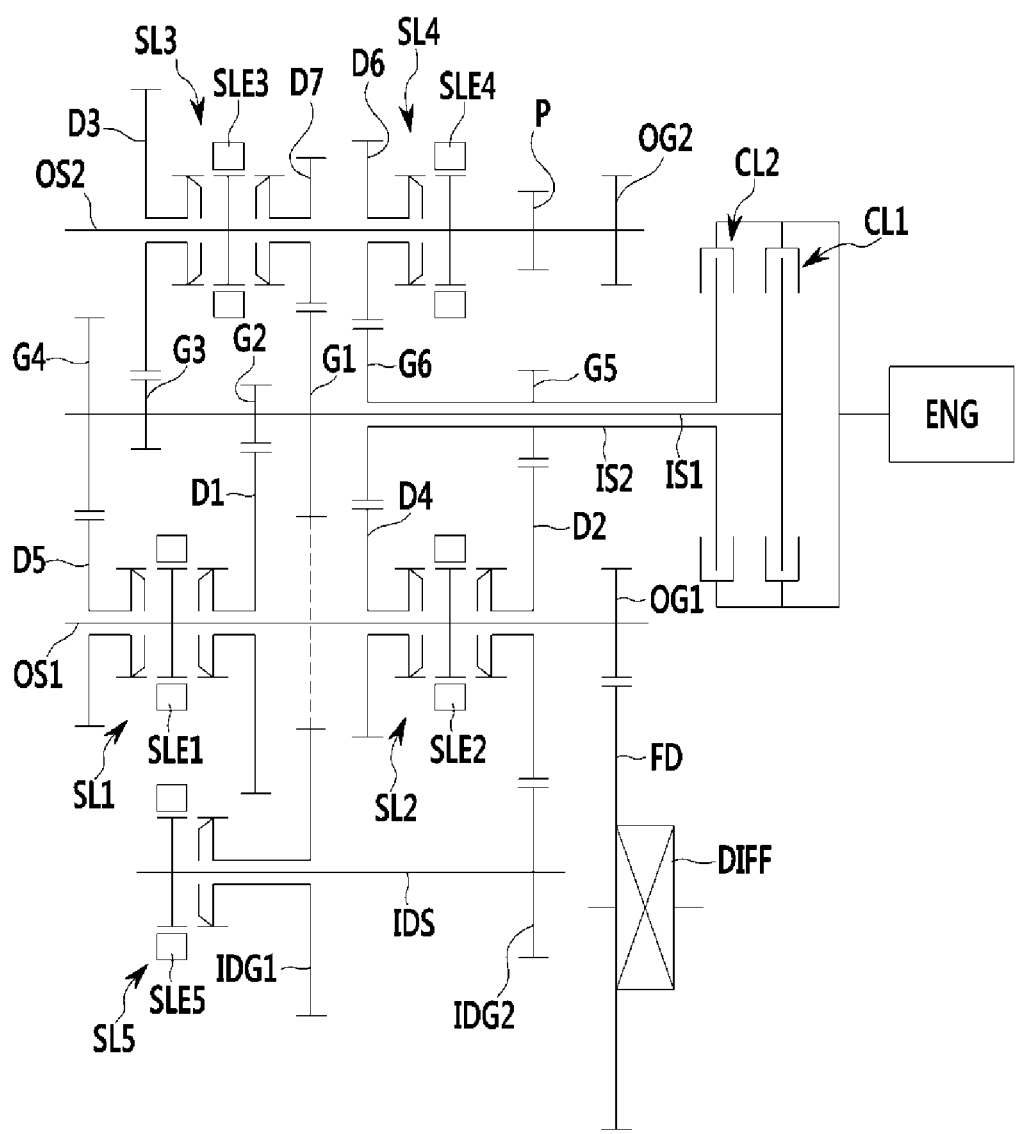
FIG. 1 is a schematic diagram of a power transmission apparatus for a vehicle according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus for a vehicle according to the first exemplary embodiment of the present invention.

Referring to FIG. 1, a power transmission apparatus according to the first exemplary embodiment of the present invention includes a selective connection unit including first and second clutches CL1 and CL2 and selectively transmitting torque of a power source (engine or motor) or not, an input device including first and second input shafts IS1 and IS2, a speed output device changing and outputting torque input from the input device, and a reverse speed output unit.

The power source may be an engine in a case of a typical vehicle provided with an internal combustion engine and a manual or an automatic transmission, and may be a motor in a case of a hybrid electric vehicle including an electric vehicle. For better comprehension and ease of description, it is exemplified in the exemplary embodiments of the present invention that the power source is an engine.

The first and second clutches CL1 and CL2 selectively transmit the torque of the engine ENG to the first and second input shafts IS1 and IS2, respectively.

The first clutch C1 selectively transmits the torque of the engine ENG to the first input shaft IS1, and the second clutch CL2 selectively transmits the torque of the engine ENG to the second input shaft IS2.

The first and second clutches CL1 and CL2 may be conventional multi-plate clutches of wet type, but are not limited to this. The first and second clutches CL1 and CL2 may be conventional multi-plate clutches of dry type. The first and second clutches CL1 and CL2 may be controlled by a hydraulic control system.

The input device includes the first input shaft IS1 selectively connected to an output side of the engine ENG through the first clutch CL1, and the second input shaft IS2 being a hollow shaft, enclosing the first input shaft IS1, and selectively connected to the output side of the engine ENG through the second clutch CL2.

First, second, third, and fourth input gears G1, G2, G3, and G4 are fixedly disposed on the first input shaft IS1. The first, second, third, and fourth input gears G1, G2, G3, and G4 are disposed on a rear portion of the first input shaft IS1 penetrating through the second input shaft IS2, and are sequentially disposed from the front to the rear.

Fifth and sixth input gears G5 and G6 are fixedly disposed on the second input shaft IS2. The fifth input gear G5 is disposed on a front portion of the second input shaft IS2 and the sixth input gear G6 is disposed on a rear portion of the second input shaft IS2.

Therefore, the first input shaft IS1 and the first, second, third, and fourth input gears G1, G2, G3, and G4 fixedly disposed thereon are rotated if the first clutch CL1 is operated, and the second input shaft IS2 and the fifth and sixth input gears G5 and G6 fixedly disposed thereon are rotated if the second clutch CL2 is operated.

The first, second, third, fourth, fifth, and sixth input gears G1, G2, G3, G4, G5, and G6 are input gears operating at each gear stage. The first input gear G1 is operated at a seventh forward speed, the second input gear G2 is operated at a first forward speed, the third input gear G3 is operated at a third forward speed, and the fourth input gear G4 is operated at a fifth forward speed.

In addition, the fifth input gear G5 is operated at a second forward speed, and the sixth input gear G6 is operated at a fourth forward speed and a sixth forward speed.

The input gears G1, G2, G3, and G4 for achieving odd-numbered gear stages are disposed on the first input shaft IS1, and the input gears G5 and G6 for achieving even-numbered gear stages are disposed on the second input shaft IS2.

The speed output device includes first and second output shafts OS1 and OS2 disposed in parallel with and apart from the first and second input shafts IS1 and IS2.

A first speed gear D1 and a fifth speed gear D5 are rotatably disposed on the first output shaft OS1 and a first synchronizer SL1 selectively connecting the first speed gear D1 or the fifth speed gear D5 to the first output shaft OS1 is disposed on the first output shaft OS1. In addition, a second speed gear D2 and a fourth speed gear D4 are rotatably disposed on the first output shaft OS1 and a second synchronizer SL2 selectively connecting the second speed gear D2 or the fourth speed gear D4 to the first output shaft OS1 is disposed on the first output shaft OS1. A first output gear OG1 is fixedly disposed on a front portion of the first output shaft OS1.

The first synchronizer SL1 is disposed on a rear portion of the first output shaft OS1 and the second synchronizer SL2 is disposed on the front portion of the first output shaft OS1.

The first speed gear D1 is engaged with the second input gear G2 and the fifth speed gear D5 is engaged with the fourth input gear G4.

The second speed gear D2 is engaged with the fifth input gear G5 and the fourth speed gear D4 is engaged with the sixth input gear G6.

In addition, the first output gear OG1 outputs torque transmitted from the first output shaft OS1 to a differential apparatus DIFF through a final reduction gear FD.

In addition, a third speed gear D3 and a seventh speed gear D7 are rotatably disposed on the second output shaft OS2 and a third synchronizer SL3 selectively connecting the third speed gear D3 or the seventh speed gear D7 to the second output shaft OS2 is disposed on the second output shaft OS2. In addition, a sixth speed gear D6 is rotatably disposed on the second output shaft OS2 and a fourth synchronizer SL4 selectively connecting the sixth speed gear D6 to the second output shaft OS2 is disposed on the second output shaft OS2. A second output gear OG2 is fixedly disposed on a front portion of the second output shaft OS2.

The third synchronizer SL3 is disposed on a rear portion of the second output shaft OS2 and the fourth synchronizer SL4 is disposed on a front portion of the second output shaft OS2.

The third speed gear D3 is engaged with the third input gear G3 and the seventh speed gear D7 is engaged with the first input gear G1.

The sixth speed gear D6 is engaged with the sixth input gear G6.

The second output gear OG2 outputs torque transmitted from the second output shaft OS2 to the differential apparatus DIFF through the final reduction gear FD.

Herein, the first output gear OG1 and the second output gear OG2 are engaged to the final reduction gear FD so as to transmit the torque of the first output shaft OS1 or second output shaft OS2 to the final reduction gear FD. The torque transmitted to the final reduction gear FD is transmitted to a driving wheel through the differential apparatus DIFF.

The reverse speed output unit includes a reverse idle shaft IDS disposed in parallel with the first and second input shafts IS1 and IS2.

A first idle gear IDG1 and a second idle gear IDG2 are disposed on the reverse idle shaft IDS. The first idle gear IDG1 is rotatably disposed on the reverse idle shaft IDS and the second idle gear IDG2 is fixedly disposed on the reverse idle shaft IDS.

In addition, a fifth synchronizer SL5 selectively connecting the first idle gear IDG1 to the reverse idle shaft IDS is disposed on the reverse idle shaft IDS.

In addition, the first idle gear IDG1 is engaged with the first input gear G1 on the first input shaft IS1 and the second idle gear IDS2 is engaged with the second speed gear D2 on the first output shaft OS1.

Since the first, second, third, fourth, and fifth synchronizers SL1-SL5 are well known to a person of an ordinary skill in the art, detailed description thereof will be omitted. In addition, sleeves SLE1, SLE2, SLE3, SLE4, and SLE5 applied respectively to the first, second, third, fourth, and fifth synchronizers SL1-SL5, as well known to a person of an ordinary skill in the art, are operated by additional actuators and the actuators are controlled by a transmission control unit.

A reference numeral P in FIG. 1 that is not explained indicates a parking gear.

FIG. 2 is an operational chart of a power transmitting apparatus according to the first exemplary embodiment of the present invention.

Referring to FIG. 2, operation at each gear stage will hereinafter be described.

[First Forward Speed]

After the first speed gear D1 and the first output shaft OS1 are operably connected through the sleeve SLE1 of the first synchronizer SL1, the first clutch CL1 is operated. Then, shift to the first forward speed is achieved.

[Second Forward Speed]

In a case that vehicle speed increases at the first forward speed and shift to the second forward speed is necessary, the second speed gear D2 and the second output shaft OS2 are operably connected through the sleeve SLE2 of the second synchronizer SL2. After that, the first clutch CL1 is released and the second clutch CL2 is operated. Then, the shift to the second forward speed is achieved.

After the shift to the second forward speed is completed, the sleeve SLE1 of the first synchronizer SL1 is moved to a neutral position.

[Third Forward Speed]

In a case that the vehicle speed increases at the second forward speed and shift to the third forward speed is necessary, the third speed gear D3 and the second output shaft OS2 are operably connected through the sleeve SLE3 of the third synchronizer SL3. After that, the second clutch CL2 is released and the first clutch CL1 is operated. Then, the shift to the third forward speed is achieved.

After the shift to the third forward speed is completed, the sleeve SLE2 of the second synchronizer SL2 is moved to a neutral position.

[Fourth Forward Speed]

In a case that the vehicle speed increases at the third forward speed and shift to the fourth forward speed is necessary, the fourth speed gear D4 and the first output shaft OS1 are operably connected through the sleeve SLE2 of the second synchronizer SL2. After that, the first clutch CL1 is released and the second clutch CL2 is operated. Then, the shift to the fourth forward speed is achieved.

After the shift to the fourth forward speed is completed, the sleeve SLE3 of the third synchronizer SL3 is moved to a neutral position.

[Fifth Forward Speed]

In a case that the vehicle speed increases at the fourth forward speed and shift to the fifth forward speed is necessary, the fifth speed gear D5 and the first output shaft OS1 are operably connected through the sleeve SLE1 of the first synchronizer SL1. After that, the second clutch CL2 is released and the first clutch CL1 is operated. Then, the shift to the fifth forward speed is achieved.

After the shift to the fifth forward speed is completed, the sleeve SLE2 of the second synchronizer SL2 is moved to a neutral position.

[Sixth Forward Speed]

In a case that the vehicle speed increases at the fifth forward speed and shift to the sixth forward speed is necessary, the sixth speed gear D6 and the second output shaft OS2 are operably connected through the sleeve SLE4 of the fourth synchronizer SL4. After that, the first clutch CL1 is released and the second clutch CL2 is operated. Then, the shift to the sixth forward speed is achieved.

After the shift to the sixth forward speed is completed, the sleeve SLE1 of the first synchronizer SL1 is moved to a neutral position.

[Seventh Forward Speed]

In a case that the vehicle speed increases at the sixth forward speed and shift to the seventh forward speed is necessary, the seventh speed gear D7 and the second output shaft OS2 are operably connected through the sleeve SLE3 of the third synchronizer SL3. After that, the second clutch CL2 is released and the first clutch CL1 is operated. Then, the shift to the seventh forward speed is achieved.

After the shift to the seventh forward speed is completed, the sleeve SLE4 of the fourth synchronizer SL4 is moved to a neutral position.

[Reverse Speed]

Figure 3:
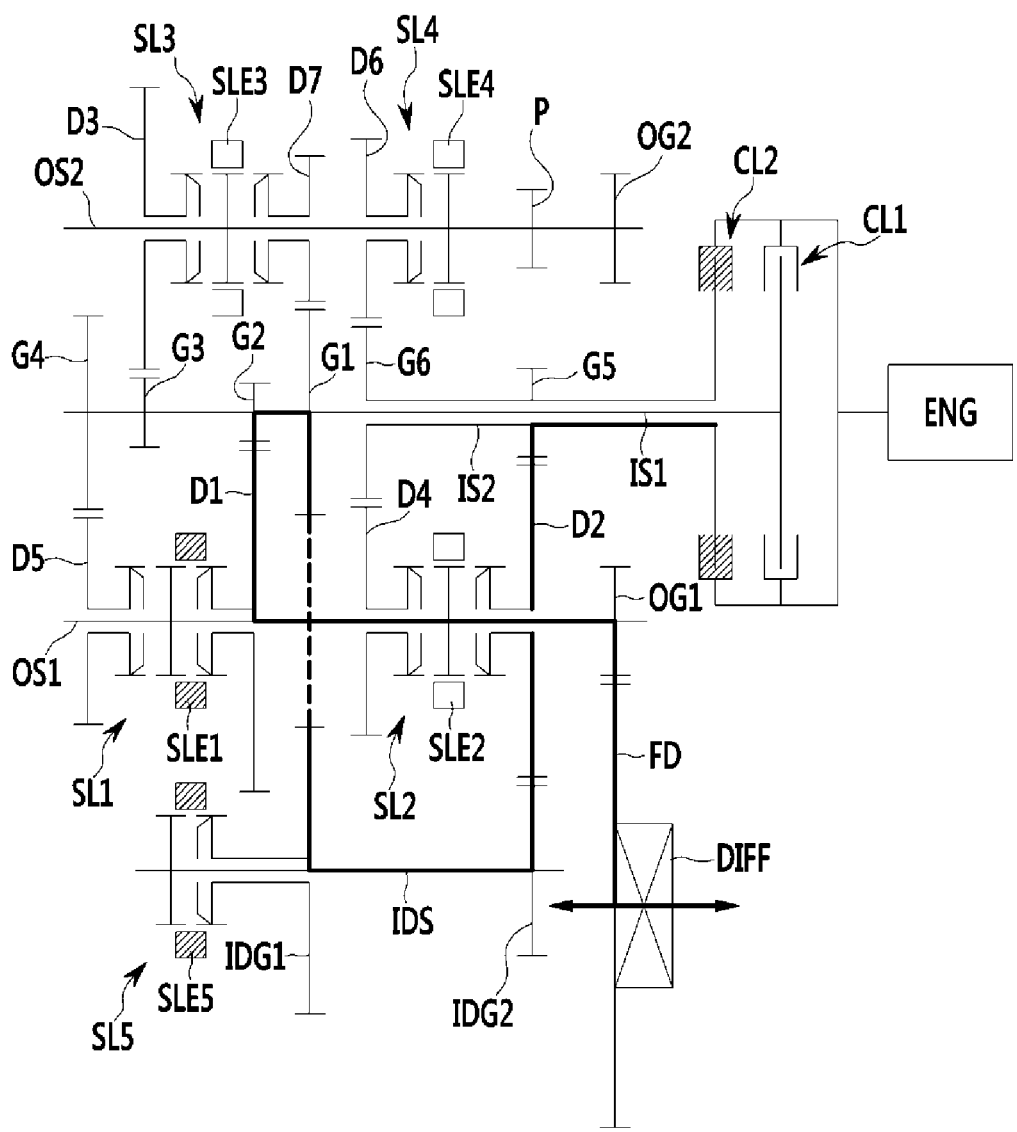
FIG. 3 is a schematic diagram for illustrating power delivery path at a reverse speed in a power transmission apparatus for a vehicle according to the various exemplary embodiments of the present invention.

FIG. 3 is a schematic diagram for illustrating power delivery path at a reverse speed in a power transmission apparatus for a vehicle according to the first exemplary embodiment of the present invention.

Referring to FIG. 2 and FIG. 3, the first speed gear D1 and the first output shaft OS1 are operably connected through the sleeve SLE1 of the first synchronizer SL1 and the first idle gear IDG1 and the reverse idle shaft IDS are operably connected through the sleeve SLE5 of the fifth synchronizer SL5 for shift to the reverse speed. After that, if the second clutch CL2 is operated, the shift to the reverse speed is achieved.

Therefore, the torque of the engine ENG is sequentially transmitted to the second input shaft IS2, the fifth input gear G5, the second speed gear D2, the second idle gear IDG2, the reverse idle shaft IDS, the fifth synchronizer SL5, the first idle gear IDG1, the first input gear G1, the second input gear G2, the first speed gear D1, the first synchronizer SL1, the first output shaft OS1, the first output gear OG1, the final reduction gear FD, and the differential apparatus DIFF.

Figure 4:
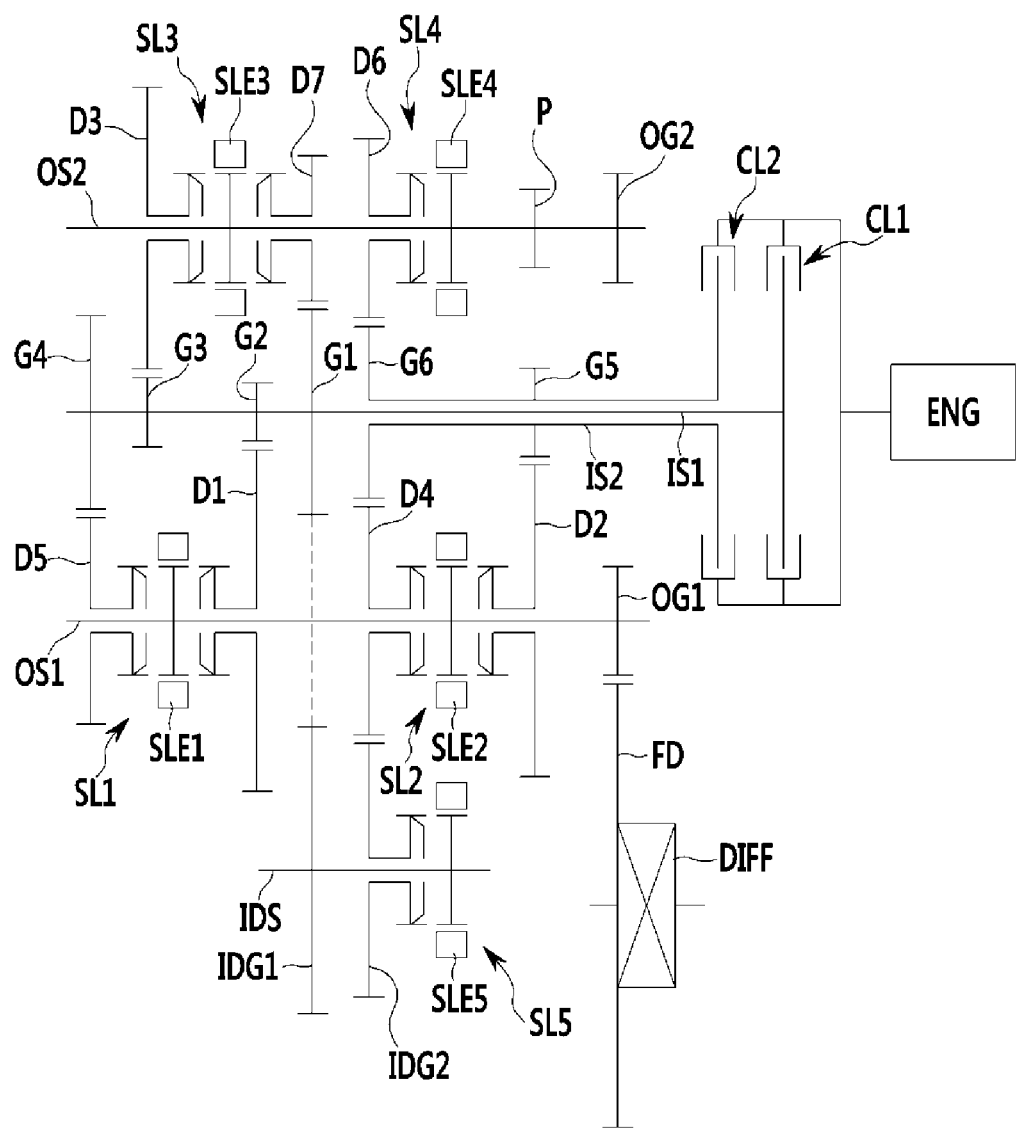
FIG. 4 is a schematic diagram of a power transmission apparatus for a vehicle according to the various exemplary embodiments of the present invention.

FIG. 4 is a schematic diagram of a power transmission apparatus for a vehicle according to the second exemplary embodiment of the present invention.

Referring to FIG. 4, a power transmission apparatus according to the second exemplary embodiment of the present invention is similar to that according to the first exemplary embodiment. Particularly, the power transmission apparatus according to second exemplary embodiment includes the selective connection unit including the first and second clutches CL1 and CL2 and selectively transmitting torque of the power source (engine or motor) or not, the input device including the first and second input shafts IS1 and IS2, the speed output device changing and outputting torque input from the input device, and the reverse speed output unit.

The first and second clutches CL1 and CL2 selectively transmit the torque of the engine ENG to the first and second input shafts IS1 and IS2, respectively.

The first clutch C1 selectively transmits the torque of the engine ENG to the first input shaft IS1, and the second clutch CL2 selectively transmits the torque of the engine ENG to the second input shaft IS2.

The input device includes the first input shaft IS1 selectively connected to the output side of the engine ENG through the first clutch CL1, and the second input shaft IS2 being the hollow shaft, enclosing the first input shaft IS1, and selectively connected to the output side of the engine ENG through the second clutch CL2.

The first, second, third, and fourth input gears G1, G2, G3, and G4 are fixedly disposed on the first input shaft IS1. The first, second, third, and fourth input gears G1, G2, G3, and G4 are disposed on the rear portion of the first input shaft IS1 penetrating through the second input shaft IS2, and are sequentially disposed from the front to the rear.

The fifth and sixth input gears G5 and G6 are fixedly disposed on the second input shaft IS2. The fifth input gear G5 is disposed on the front portion of the second input shaft IS2 and the sixth input gear G6 is disposed on the rear portion of the second input shaft IS2.

Therefore, the first input shaft IS1 and the first, second, third, and fourth input gears G1, G2, G3, and G4 fixedly disposed thereon are rotated if the first clutch CL1 is operated, and the second input shaft IS2 and the fifth and sixth input gears G5 and G6 fixedly disposed thereon are rotated if the second clutch CL2 is operated.

The first, second, third, fourth, fifth, and sixth input gears G1, G2, G3, G4, G5, and G6 are input gears operating at each gear stage. The first input gear G1 is operated at the seventh forward speed, the second input gear G2 is operated at the first forward speed, the third input gear G3 is operated at the third forward speed, and the fourth input gear G4 is operated at the fifth forward speed.

In addition, the fifth input gear G5 is operated at the second forward speed, and the sixth input gear G6 is operated at the fourth forward speed and a sixth forward speed.

The input gears G1, G2, G3, and G4 for achieving the odd-numbered gear stages are disposed on the first input shaft IS1, and the input gears G5 and G6 for achieving the even-numbered gear stages are disposed on the second input shaft IS2.

The speed output device includes the first and second output shafts OS1 and OS2 disposed in parallel with and apart from the first and second input shafts IS1 and IS2.

The first speed gear D1 and the fifth speed gear D5 are rotatably disposed on the first output shaft OS1 and the first synchronizer SL1 selectively connecting the first speed gear D1 or the fifth speed gear D5 to the first output shaft OS1 is disposed on the first output shaft OS1. In addition, the second speed gear D2 and the fourth speed gear D4 are rotatably disposed on the first output shaft OS1 and the second synchronizer SL2 selectively connecting the second speed gear D2 or the fourth speed gear D4 to the first output shaft OS1 is disposed on the first output shaft OS1. The first output gear OG1 is fixedly disposed on the front portion of the first output shaft OS1.

The first synchronizer SL1 is disposed on the rear portion of the first output shaft OS1 and the second synchronizer SL2 is disposed on the front portion of the first output shaft OS1.

The first speed gear D1 is engaged with the second input gear G2 and the fifth speed gear D5 is engaged with the fourth input gear G4.

The second speed gear D2 is engaged with the fifth input gear G5 and the fourth speed gear D4 is engaged with the sixth input gear G6.

In addition, the first output gear OG1 outputs torque transmitted from the first output shaft OS1 to the differential apparatus DIFF through the final reduction gear FD.

In addition, the third speed gear D3 and the seventh speed gear D7 are rotatably disposed on the second output shaft OS2 and the third synchronizer SL3 selectively connecting the third speed gear D3 or the seventh speed gear D7 to the second output shaft OS2 is disposed on the second output shaft OS2. In addition, the sixth speed gear D6 is rotatably disposed on the second output shaft OS2 and the fourth synchronizer SL4 selectively connecting the sixth speed gear D6 to the second output shaft OS2 is disposed on the second output shaft OS2. The second output gear OG2 is fixedly disposed on the front portion of the second output shaft OS2.

The third synchronizer SL3 is disposed on the rear portion of the second output shaft OS2 and the fourth synchronizer SL4 is disposed on a front portion of the second output shaft OS2.

The third speed gear D3 is engaged with the third input gear G3 and the seventh speed gear D7 is engaged with the first input gear G1.

The sixth speed gear D6 is engaged with the sixth input gear G6.

The second output gear OG2 outputs torque transmitted from the second output shaft OS2 to the differential apparatus DIFF through the final reduction gear FD.

The reverse speed output unit includes the reverse idle shaft IDS disposed in parallel with the first and second input shafts IS1 and IS2.

The first idle gear IDG1 and the second idle gear IDG2 are disposed on the reverse idle shaft IDS. The first idle gear IDG1 is rotatably disposed on the reverse idle shaft IDS and the second idle gear IDG2 is fixedly disposed on the reverse idle shaft IDS.

In addition, the fifth synchronizer SL5 selectively connecting the first idle gear IDG1 to the reverse idle shaft IDS is disposed on the reverse idle shaft IDS.

In addition, the first idle gear IDG1 is engaged with the first input gear G1 on the first input shaft IS1 and the second idle gear IDS2 is engaged with the second speed gear D2 on the first output shaft OS1.

The selective connection unit, the input device, and the speed output device according to the second exemplary embodiment of the present invention are the same as those of the first exemplary embodiment except the reverse speed output unit.

Therefore, operations of the first, second, third, fourth, and fifth synchronizers SL1, SL2, SL3, SL4, and SL5 and the first and second clutches CL1 and CL2 are the same in the first and second exemplary embodiments.

Figure 5:
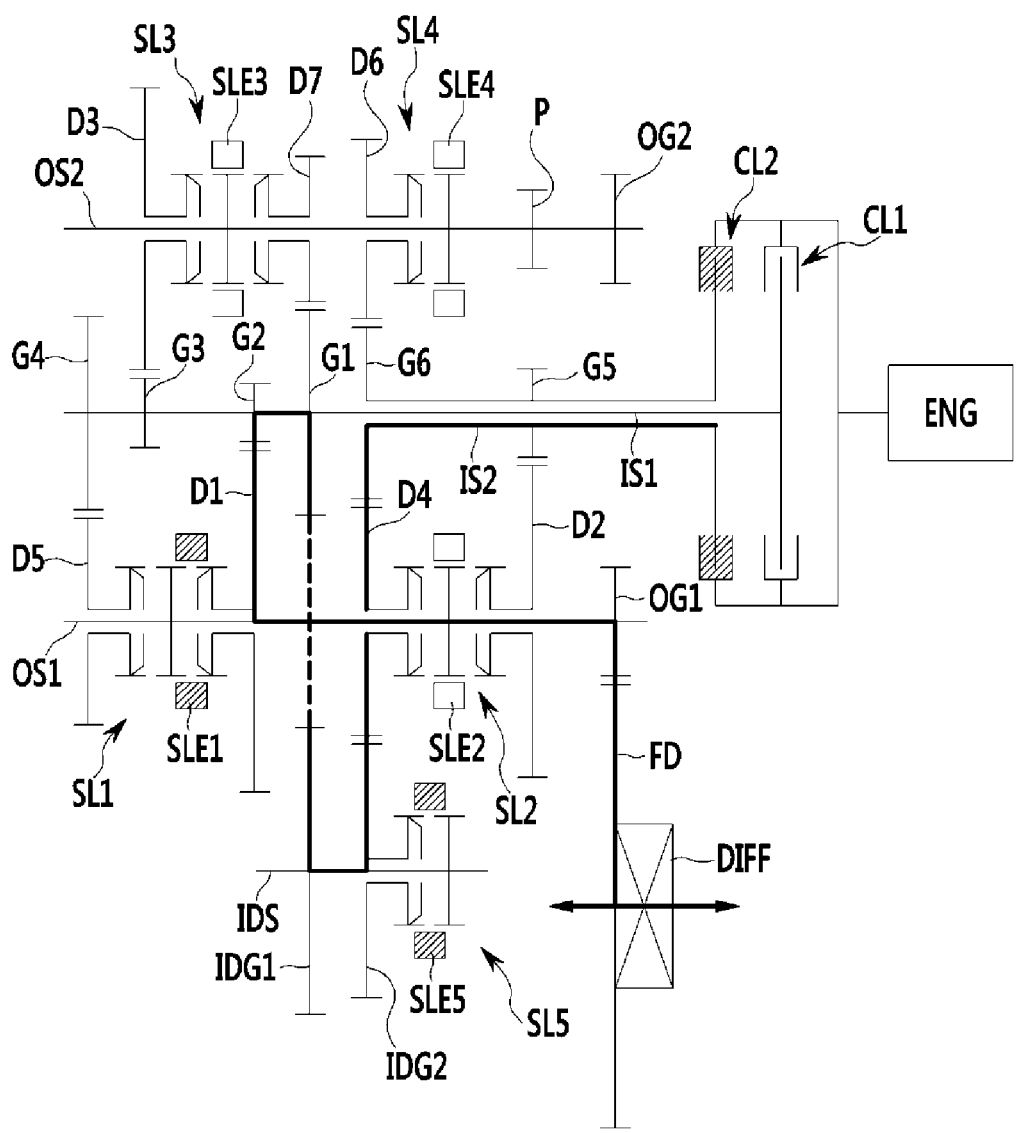
FIG. 5 is a schematic diagram for illustrating power delivery path at a reverse speed in a power transmission apparatus for a vehicle according to the various exemplary embodiments of the present invention.

FIG. 5 is a schematic diagram for illustrating power delivery path at a reverse speed in a power transmission apparatus for a vehicle according to the second exemplary embodiment of the present invention.

Referring to FIG. 5, the first speed gear D1 and the first output shaft OS1 are operably connected through the sleeve SLE1 of the first synchronizer SL1 and the second idle gear IDG2 and the reverse idle shaft IDS are operably connected through the sleeve SLE5 of the fifth synchronizer SL5 for the shift to the reverse speed in the second exemplary embodiment of the present invention. After that, if the second clutch CL2 is operated, the shift to the reverse speed is achieved.

Therefore, the torque of the engine ENG is sequentially transmitted to the second input shaft IS2, the sixth input gear G6, the fourth speed gear D4, the second idle gear IDG2, the fifth synchronizer SL5, the reverse idle shaft IDS, the first idle gear IDG1, the first input gear G1, the second input gear G2, the first speed gear D1, the first synchronizer SL1, the first output shaft OS1, the first output gear OG1, the final reduction gear FD, and the differential apparatus DIFF.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission apparatus for a vehicle comprising:
   a first input shaft selectively connected to a power source through a first clutch;
   a second input shaft selectively connected to the power source through a second clutch;
   first and second output shafts disposed in parallel with the first and second input shafts;
   a first set of input gears fixedly disposed on the first input shaft and including first, second, third, and fourth input gears;
   a second set of input gears fixedly disposed on the second input shaft and including fifth and sixth input gears;
   a first set of speed gears rotatably disposed on the first output shaft and including a first speed gear engaged with the second input gear, a second speed gear engaged with the fifth input gear, a fourth speed gear engaged with the sixth input gear, and a fifth speed gear engaged with the fourth input gear;
   a second set of speed gears rotatably disposed on the second output shaft and including a third speed gear engaged with the third input gear, a sixth speed gear engaged with the sixth input gear, and a seventh speed gear engaged with the first input gear;
   a first set of synchronizers including a first synchronizer selectively connecting the first speed gear or the fifth speed gear to the first output shaft, and a second synchronizer selectively connecting the second speed gear or the fourth speed gear to the first output shaft;
   a second set of synchronizers including a third synchronizer selectively connecting the third speed gear or the seventh speed gear to the second output shaft, and a fourth synchronizer selectively connecting the sixth speed gear to the second output shaft; and
   a reverse speed output unit including a reverse idle shaft disposed in parallel with the first and second output shafts, a first idle gear engaged with the first input gear, and a second idle gear engaged with the second speed gear or the fourth speed gear,
   wherein one of the first idle gear and the second idle gear is fixedly disposed on the reverse idle shaft and another of the first idle gear and the second idle gear is rotatably disposed on the reverse idle shaft, and
   wherein the reverse speed output unit includes a further synchronizer selectively connecting the another of the first idle gear and the second idle gear to the reverse idle shaft.

2. The power transmission apparatus of claim 1, wherein the first idle gear is engaged with the first input gear and the second idle gear is engaged with the second speed gear.

3. The power transmission apparatus of claim 2, wherein the first idle gear is rotatably disposed on the reverse idle shaft and the second idle gear is fixedly disposed on the reverse idle shaft.

4. The power transmission apparatus of claim 1, wherein the first idle gear is engaged with the first input gear and the second idle gear is engaged with the fourth speed gear.

5. The power transmission apparatus of claim 4, wherein the first idle gear is fixedly disposed on the reverse idle shaft and the second idle gear is rotatably disposed on the reverse idle shaft.

6. The power transmission apparatus of claim 1, further comprising:
   a first output gear fixedly disposed on the first output shaft and outputting torque of the first output shaft; and
   a second output gear fixedly disposed on the second output shaft and outputting torque of the second output shaft.

7. A power transmission apparatus for a vehicle comprising:
   a first input shaft selectively connected to a power source through a first clutch and having first, second, third, and fourth input gears fixedly disposed thereon;
   a second input shaft selectively connected to the power source through a second clutch and having fifth and sixth input gears fixedly disposed thereon;
   a first output shaft disposed in parallel with the first and second input shafts and having a first speed gear engaged with the second input gear, a second speed gear engaged with the fifth input gear, a fourth speed gear engaged with the sixth input gear, and a fifth speed gear engaged with the fourth input gear;
   a second output shaft disposed in parallel with the first and second input shafts and having a third speed gear engaged with the third input gear, a sixth speed gear engaged with the sixth input gear, and a seventh speed gear engaged with the first input gear;
   a first synchronizer selectively connecting the first speed gear or the fifth speed gear to the first output shaft;
   a second synchronizer selectively connecting the second speed gear or the fourth speed gear to the first output shaft;
   a third synchronizer selectively connecting the third speed gear or the seventh speed gear to the second output shaft; and
   a fourth synchronizer selectively connecting the sixth speed gear to the second output shaft;
   a reverse speed output unit including a reverse idle shaft disposed in parallel with the first and second output shafts, a first idle gear engaged with the first input gear, and a second idle gear engaged with the second speed gear or the fourth speed gear,
   wherein one of the first idle gear and the second idle gear is fixedly disposed on the reverse idle shaft and another of the first idle gear and the second idle gear is rotatably disposed on the reverse idle shaft, and wherein the reverse speed output unit includes a further synchronizer selectively connecting the another of the first idle gear and the second idle gear to the reverse idle shaft.

8. The power transmission apparatus of claim 7, wherein the first idle gear is engaged with the first input gear and the second idle gear is engaged with the second speed gear.

9. The power transmission apparatus of claim 8, wherein the first idle gear is rotatably disposed on the reverse idle shaft and the second idle gear is fixedly disposed on the reverse idle shaft.

10. The power transmission apparatus of claim 7, wherein the first idle gear is engaged with the first input gear and the second idle gear is engaged with the fourth speed gear.

11. The power transmission system of claim 10, wherein the first idle gear is fixedly disposed on the reverse idle shaft and the second idle gear is rotatably disposed on the reverse idle shaft.

12. The power transmission apparatus of claim 7, further comprising:
   a first output gear fixedly disposed on the first output shaft and outputting torque of the first output shaft; and
   a second output gear fixedly disposed on the second output shaft and outputting torque of the second output shaft.

\* \* \* \* \*